United States Patent
Miyoshi et al.

(10) Patent No.: US 8,584,533 B2
(45) Date of Patent: Nov. 19, 2013

(54) MAGNETOSTRICTIVE TORQUE SENSOR DEVICE, MANUFACTURING METHOD THEREOF, AND VEHICLE STEERING APPARATUS

(75) Inventors: Takashi Miyoshi, Saitama (JP); Yoshihiro Oniwa, Saitama (JP); Yasuo Shimizu, Saitama (JP); Atsuhiko Yoneda, Saitama (JP); Yutaka Arimura, Saitama (JP); Katsuji Watanabe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1106 days.

(21) Appl. No.: 12/380,619

(22) Filed: Mar. 2, 2009

(65) Prior Publication Data

US 2009/0218162 A1   Sep. 3, 2009

(30) Foreign Application Priority Data

Mar. 3, 2008 (JP) ................. 2008-052093
Mar. 3, 2008 (JP) ................. 2008-052413

(51) Int. Cl.
*G01L 3/10* (2006.01)
*G01B 7/24* (2006.01)
*B62D 5/04* (2006.01)

(52) U.S. Cl.
USPC ............. 73/862.331; 73/779; 180/443

(58) Field of Classification Search
USPC ........ 73/862.331, 862.333, 862.334, 779; 180/443
See application file for complete search history.

(56) References Cited

U.S. PATENT DOCUMENTS

| | | | |
|---|---|---|---|
| 4,448,084 A | 5/1984 | Dobler et al. | |
| 5,526,704 A * | 6/1996 | Hoshina et al. | 73/862.335 |
| 6,260,422 B1 | 7/2001 | Odachi et al. | |
| 6,370,967 B1 | 4/2002 | Kouketsu et al. | |
| 2001/0029791 A1 * | 10/2001 | Sezaki | 73/862.333 |
| 2004/0041494 A1 * | 3/2004 | Suzuki et al. | 310/259 |
| 2007/0283767 A1 | 12/2007 | Watanabe et al. | |

FOREIGN PATENT DOCUMENTS

| | | |
|---|---|---|
| JP | 4-158232 A | 6/1992 |
| JP | 9-196779 A | 7/1997 |
| JP | 09-288020 A | 11/1997 |
| JP | 10-339679 A | 12/1998 |
| JP | 11-132877 A | 5/1999 |
| JP | 11-178808 | 7/1999 |
| JP | 2007-240311 A | 9/2007 |
| JP | 2007-292727 | 11/2007 |

* cited by examiner

*Primary Examiner* — Paul N Dickson
*Assistant Examiner* — Daniel Yeagley
(74) *Attorney, Agent, or Firm* — Carrier Blackman & Associates, P.C.; William D. Blackman; Joseph P. Carrier

(57) ABSTRACT

A magnetostrictive torque sensor device which detects a torque applied to a rotary shaft is provided. The magnetostrictive torque sensor device includes a magnetostrictive portion provided on a surface of the rotary shaft, a coil and a cylindrical back-yoke disposed in outer periphery of the coil. The coil includes a bobbin arranged in outer periphery of the magnetostrictive portion, and a wire wound around the bobbin. A slit is provided on the back-yoke.

7 Claims, 16 Drawing Sheets

MAGNETOSTRICTIVE TORQUE SENSOR DEVICE, MANUFACTURING METHOD THEREOF, AND VEHICLE STEERING APPARATUS

FIELD OF THE INVENTION

The present disclosure relates to a magnetostrictive torque sensor device, a manufacturing method thereof which detects a torque applied to a rotary shaft by detecting a variation in a magnetic characteristic of a magnetostrictive film by means of a coil. Further, the present invention relates to a vehicle steering apparatus using the magnetostrictive torque sensor device as a steering torque sensor.

DESCRIPTION OF RELATED ART

The Japanese Patent Applications Laid-Open No. H11-132877 and No. 2007-292727 have disclosed examples of a related-art magnetostrictive torque sensor device for detecting a torque applied to a shaft. The magnetostrictive torque sensor device includes a pair of magnetostrictive films which is formed in an outer periphery of the shaft so as to have magnetic anisotropy opposite to each other. A magnetization coil and a detection coil which respectively surround outer peripheries of the magnetostrictive films. In the related art, a variation in magnetic permeability of the pair of magnetostrictive films depending on a torsion deformation of the shaft is detected on the basis of a variation in alternating-current resistance of the magnetization coil and the detection coil so as to detect a torque input to the shaft.

The related-art magnetostrictive torque sensor device includes a back-yoke which surrounds peripheries of the magnetization coil and the detection coil and forms a magnetic path. Since the back-yoke of the related-art magnetostrictive torque sensor device surrounds peripheries of the magnetization coil and the detection coil by 360°, an eddy current easily occurs, and thus a problem may arise in that the eddy current has a bad influence on detection precision.

Since a magnetic flux easily occurs at an edge of the back-yoke, when an edge shape of the back-yoke is irregular or a difference occurs in the edge shape, a problem may arise in that a difference in alternating-current resistance of the coil occurs.

SUMMARY OF INVENTION

The present invention provides a magnetostrictive torque sensor device to improve detection precision by suppressing an eddy current occurring in a back-yoke and by stabilizing an alternating-current resistance of a coil in the case where the back-yoke is disposed in an outer periphery of a coil of the magnetostrictive torque sensor device.

Further, the present invention provides a magnetostrictive torque sensor device and a manufacturing method thereof to ensure rigidity of the back-yoke with respect to a load in a radial direction.

According to a first aspect of the invention, a magnetostrictive torque sensor device which detects a torque applied to a rotary shaft, is provided with a magnetostrictive portion provided on a surface of the rotary shaft, a coil including a bobbin arranged in outer periphery of the magnetostrictive portion and a wire wound around the bobbin, and a cylindrical back-yoke disposed in outer periphery of the coil. In the magnetostrictive torque sensor device, a slit extending in an axial direction is provided on the back-yoke.

According to a second aspect of the invention, the slit may be interposed between a pair of flat end surfaces having a predetermined width in a radial direction.

According to a third aspect of the invention, a terminal block which connects the wire with an external wiring may be disposed within the slit.

According to a fourth aspect of the invention, the back-yoke may be formed by curving a rectangular magnetic metal plate into a cylindrical shape so that the slit is formed between the pair of facing end surfaces of the rectangular magnetic metal plate.

According to a fifth aspect of the invention, the magnetostrictive torque sensor device may be further provided with a pair of yoke rings, having no slit, disposed at both axial ends of the back-yoke, and the back-yoke and the yoke rings may be disposed with a gap so as not to contact with each other.

According to a sixth aspect of the invention, the bobbin may include an annular extension portion which extends outward in a radial direction, and the extension portion may be interposed in the gap between the back-yoke and the yoke rings.

According to a seventh aspect of the invention, the magnetostrictive torque sensor device may be further provided with a synthetic-resin housing arranged in outer periphery of the back-yoke, and the bobbin in the coil, the terminal block, and the back-yoke may be disposed within the housing in an integral fashion.

According to an eighth aspect of the invention, a vehicle steering apparatus may be provided with the magnetostrictive torque sensor device used as a steering torque sensor which detects a steering torque input to steering shafts, and an operation of an actuator of an electric power steering apparatus may be controlled on the basis of the steering torque detected by the steering torque sensor.

According to a ninth aspect of the invention, a method which manufactures a magnetostrictive torque sensor device including a coil including a bobbin and a wire wound around the bobbin, and a cylindrical back-yoke disposed in outer periphery of the coil, is provided with steps of forming a coil unit by assembling the bobbin in the coil, the back-yoke, and the terminal block, putting the coil unit in a cavity of a die, forming a housing by injecting synthetic resin into the cavity of the die and extracting the housing, in which the coil unit is disposed, from the die.

Other aspects and advantages of the invention will be apparent from the following description, the drawings and the claims.

DETAILED DESCRIPTION OF EXEMPLARY EMBODIMENTS

Hereinafter, a first embodiment of the invention will be described with reference to FIGS. 1 to 6.

Figure 1:
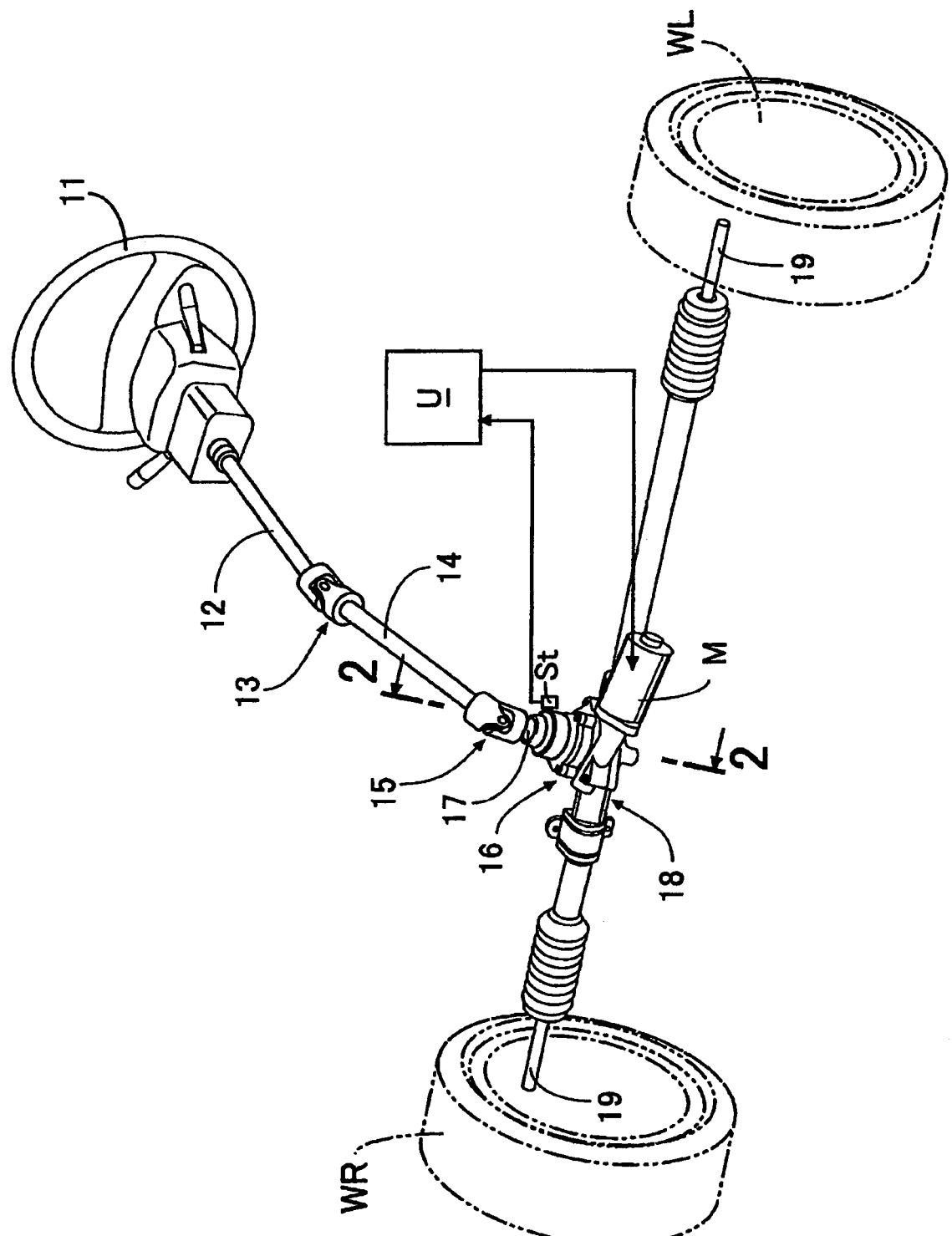
FIG. 1 is an entire perspective view showing an electric power steering apparatus according to a first embodiment.

As shown in FIG. 1, an upper steering shaft 12 which rotates together with a steering wheel 11 is connected to a pinion shaft 17 which protrudes upward from a decelerator 16 via an upper universal joint 13, a lower steering shaft 14, and a lower universal joint 15. Tie-rods 19 which respectively protrude from both left and right ends of a steering gear box 18 connected to a lower end of the decelerator 16 are respectively connected to knuckles (not shown) of left and right vehicle wheels WL and WR. A motor M is supported to the decelerator 16, and an operation of the motor M is controlled by an electric control unit U which receives a signal from a steering torque sensor St received in the inside of the decelerator 16.

Figure 2:
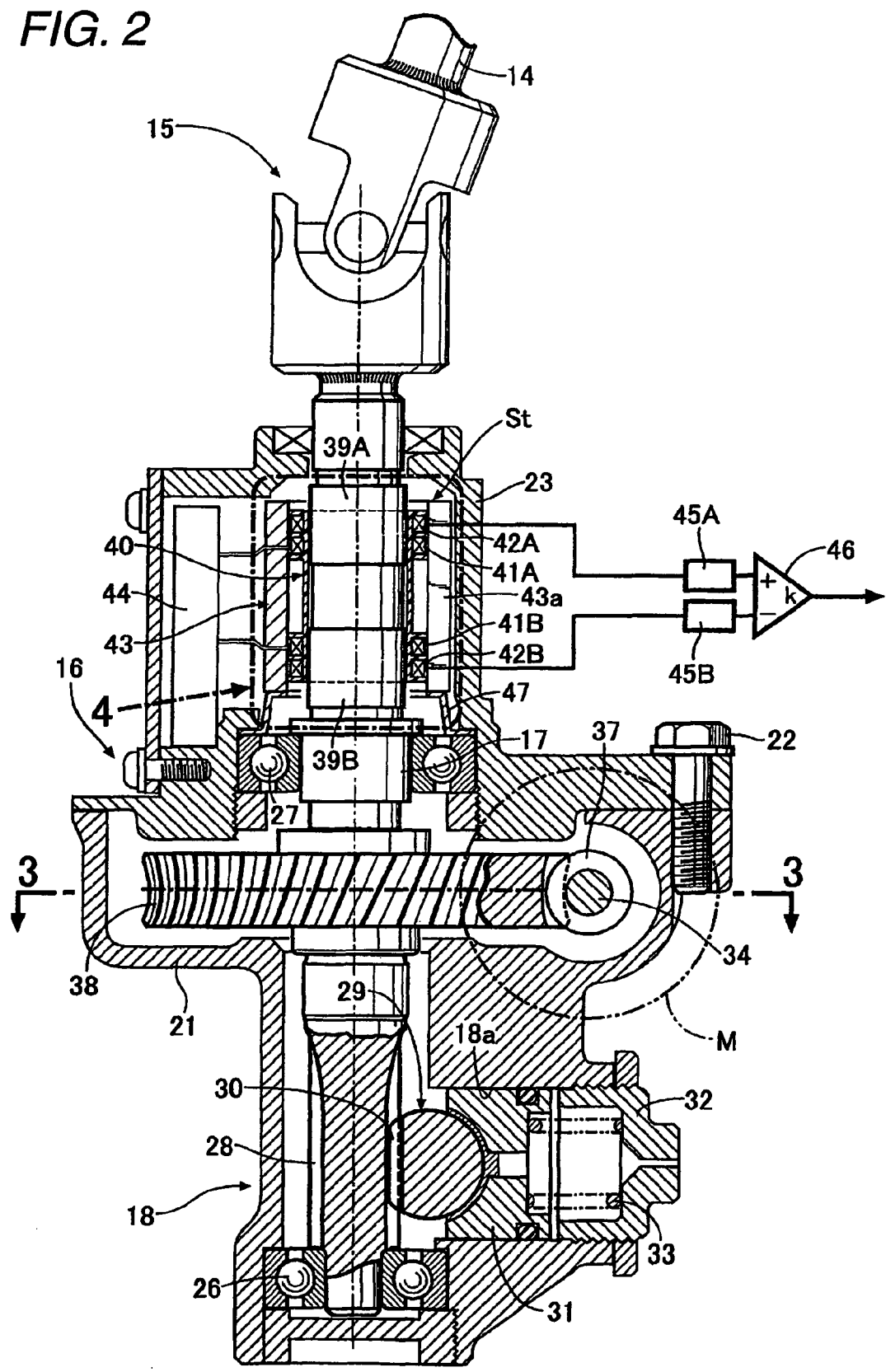
FIG. 2 is an enlarged sectional view taken along the line 2-2 of FIG. 1.
Figure 3:
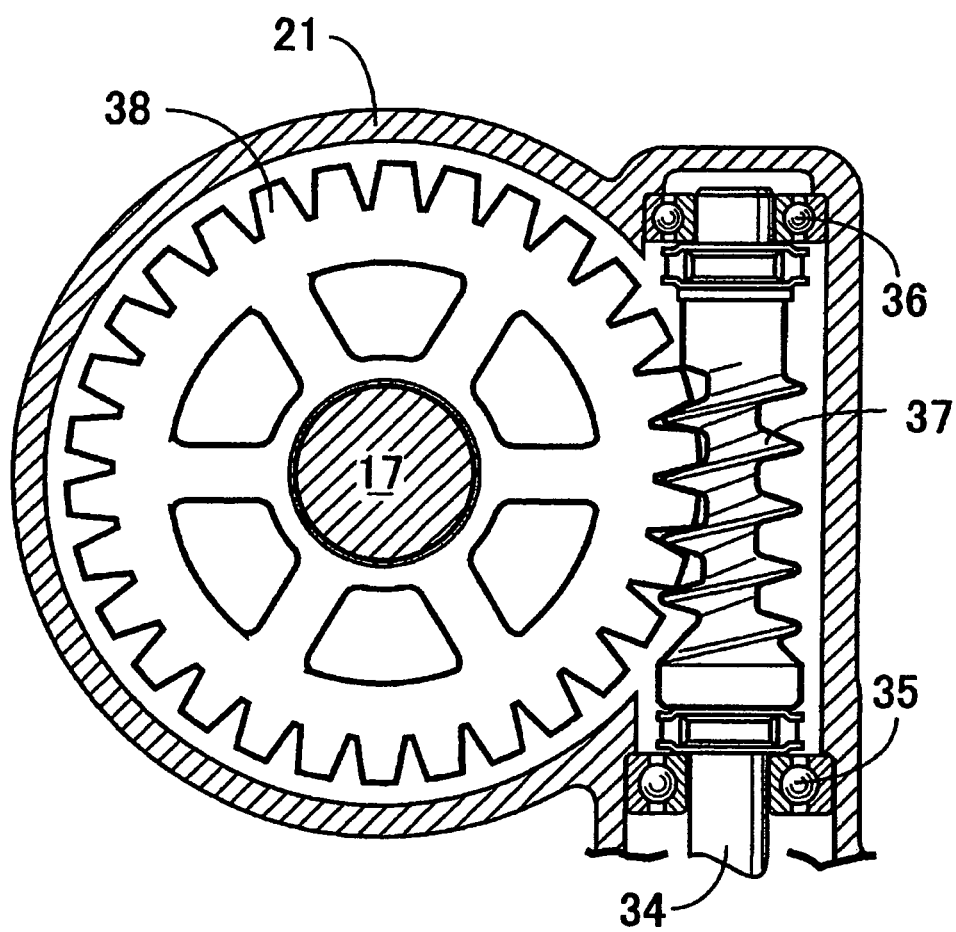
FIG. 3 is a sectional view taken along the line 3-3 of FIG. 2.

As shown in FIGS. 2 and 3, the decelerator 16 includes a lower case 21 which is integrally formed with the steering gear box 18 and an upper case 23 which is coupled to an upper surface of the lower case 21 by means of bolts 22. The pinion shaft 17 is rotatably supported to the steering gear box 18 and the upper case 23 by means of ball bearings 26 and 27. A pinion 28 which is provided at a lower end of the pinion shaft 17 is fitted to a rack 30 which is provided in a rack bar 29. The rack bar 29 is supported to the inside of the steering gear box 18 so as to be movable in a traverse direction. A pressing member 31 is slidably received in a perforation hole 18a which is formed in the steering gear box 18. A spring 33 is disposed between the pressing member 31 and a nut member 32 used to close the perforation hole 18a. When the spring 33 is urged toward a rear surface of the rack bar 29, a bending of the rack bar 29 is suppressed. Accordingly, it is possible to correctly fit the rack 30 to the pinion 28.

A rotary shaft 34 belonging to the motor M and extending to the inside of the decelerator 16 is rotatably supported to the lower case 21 by means of a pair of ball bearings 35 and 36. A worm 37 provided in the rotary shaft 34 of the motor M is fitted to a worm wheel 38 fixed to the pinion shaft 17.

Figure 4:
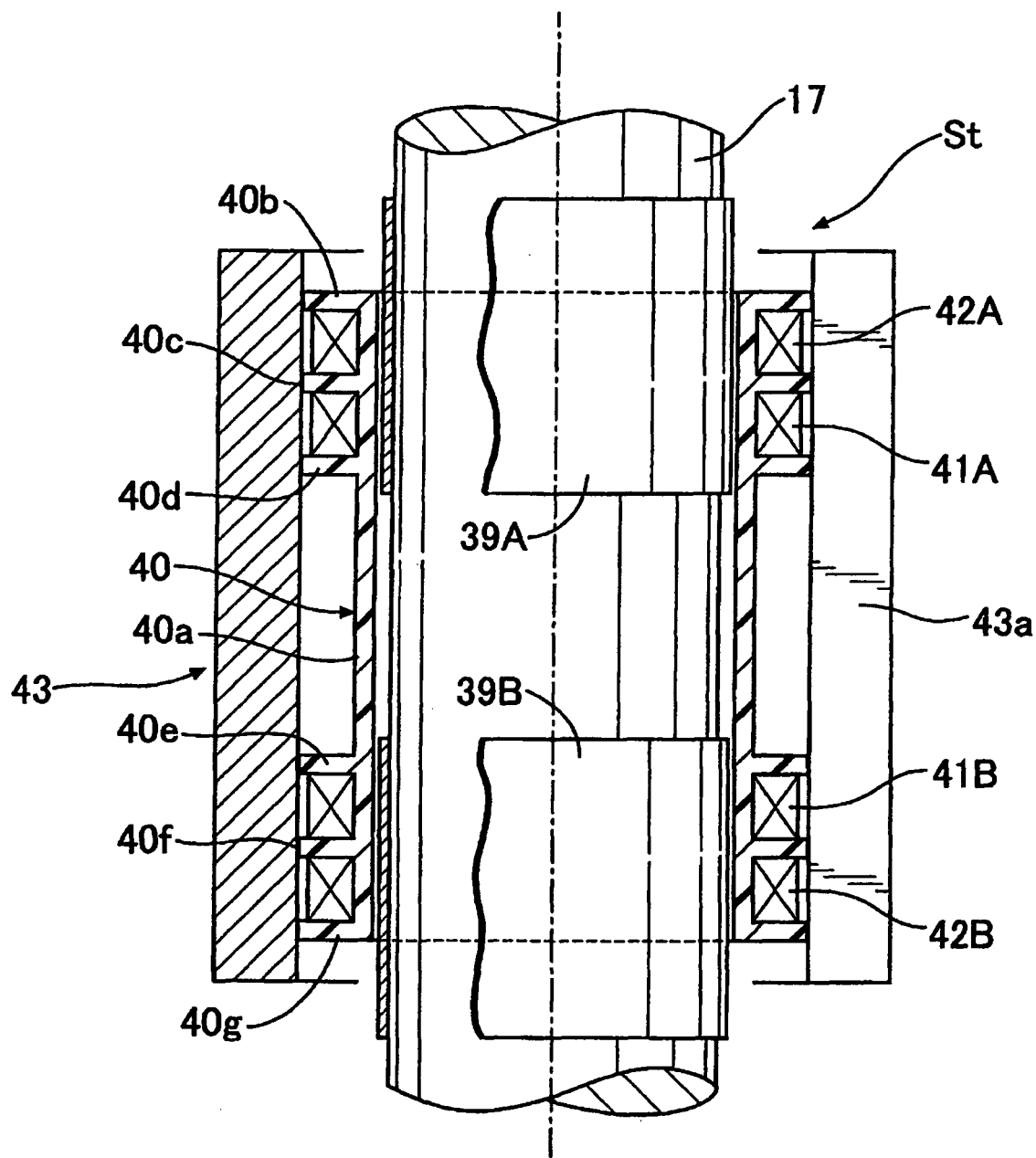
FIG. 4 is an enlarged view showing a part indicated by "4" in FIG. 2.

As shown in FIGS. 2 and 4, the steering torque sensor St for detecting a steering torque input from the steering wheel 11 includes first and second magnetostrictive films 39A and 39B, a first magnetization coil 41A, a first detection coil 42A, a second magnetization coil 41B, a second detection coil 42B and a back-yoke 43. The first and second magnetostrictive films 39A and 39B are made of, for example, Ni—Fe plate so as to cover a predetermined width of a surface of the pinion shaft 17. The first magnetization coil 41A and the first detection coil 42A are wound around an upper part of a synthetic-resin bobbin 40 so as to surround a periphery of the first magnetostrictive film 39A. The second magnetization coil 41B and the second detection coil 42B are wound around a lower part of the bobbin 40 so as to surround a periphery of the second magnetostrictive film 39B. The back-yoke 43 is formed into a substantially cylindrical shape by means of a magnetic body so as to surround the first magnetization coil 41A, the first detection coil 42A, the second magnetization coil 41B, and the second detection coil 42B.

Figure 5:
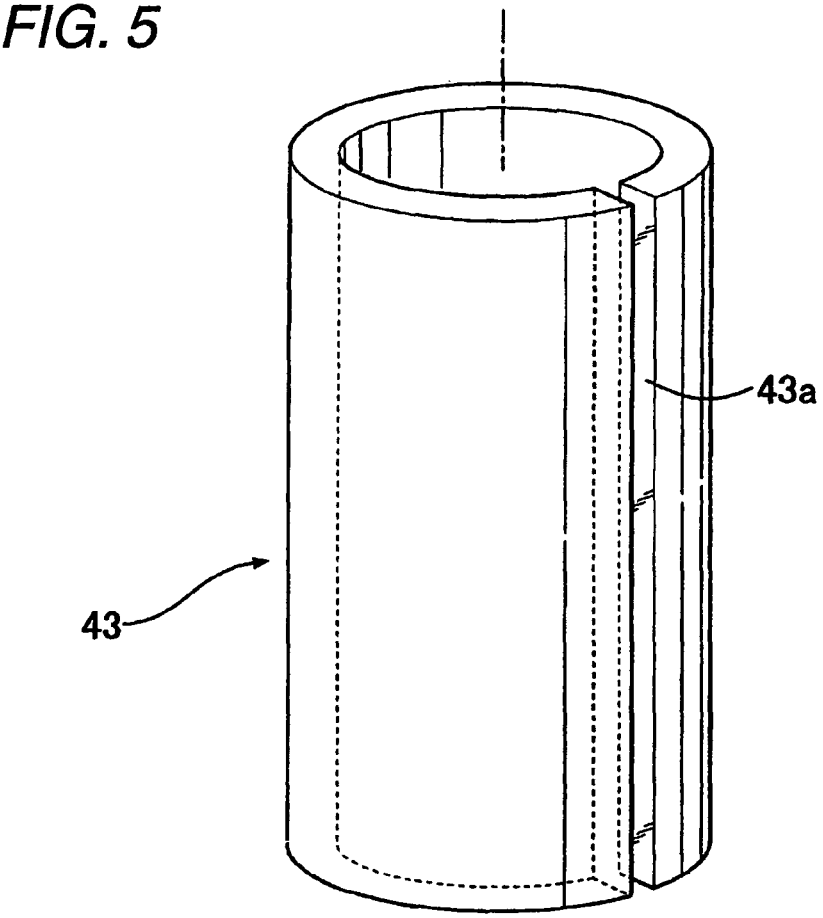
FIG. 5 is a perspective view showing a back-yoke.

As apparently shown in FIG. 5, the back-yoke 43 is obtained in such a manner that a rectangular plate member formed by a magnetic body is curved in a substantially cylindrical shape. A slit 43a is formed between the two facing end surfaces. The two end surfaces interposing the slit 43a of the back-yoke 43 are formed in a flatly thin and long rectangular shape. Since the back-yoke 43 is formed by curving the rectangular magnetic metal plate into the cylindrical shape, and the slit 43a is formed between the pair of facing end surfaces of the back-yoke 43, it is possible to simplify a structure of the back-yoke 43 and thus to reduce a manufacture cost.

The bobbin 40 includes first to sixth flanges 40b to 40g which protrude outward in a radial direction from a cylindrical bobbin body 40a. The first detection coil 42A is wound between the first and second flanges 40b and 40c. The first magnetization coil 41A is wound between the second and third flanges 40c and 40d. The second magnetization coil 41B is wound between the fourth and fifth flanges 40e and 40f. The second detection coil 42B is wound between the fifth and six flanges 40f and 40g.

The first and second magnetization coils 41A and 41B are connected to a magnetization circuit 44. The first and second detection coils 42A and 42B are respectively connected to first and second conversion circuits 45A and 45B. The first and second conversion circuits 45A and 45B are connected to an amp 46.

When a torsion deformation occurs in the pinion shaft 17 due to an applied torque, magnetic permeability of the first and second magnetostrictive films 39A and 39B varies. For this reason, when a high-frequency alternating voltage is applied from the magnetization circuit 44 to the first and second magnetization coils 41A and 41B, it is possible to detect variations in magnetic permeability of the first and second magnetostrictive films 39A and 39B in a form of variations in impedance of the first and second detection coils 42A and 42B.

As shown in FIG. 2, the back-yoke 43 and the bobbin 40 are supported to the upper case 23 via a stay 47.

Figure 6:
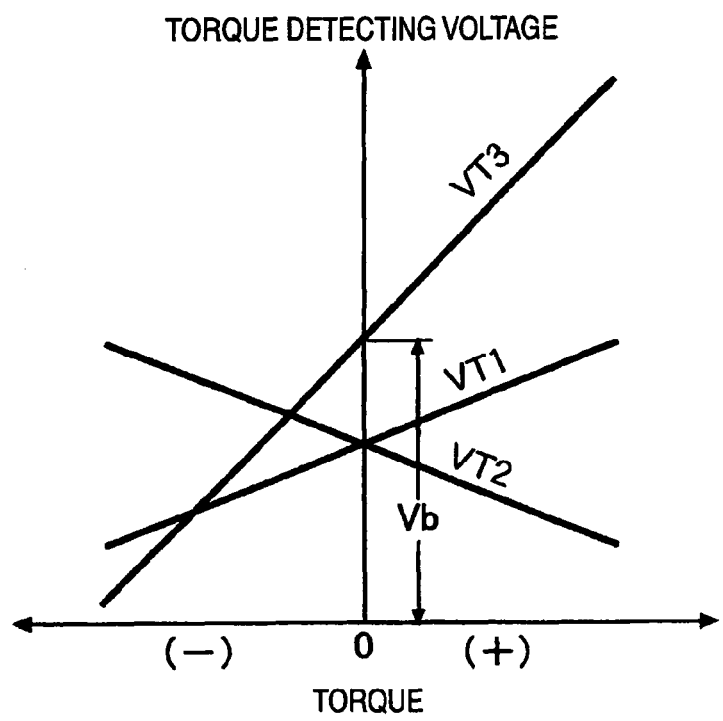
FIG. 6 is a view showing a variation in a characteristic of a torque detection signal with respect to a steering torque.

As shown in FIG. 6, the variations in impedance of the first and second detection coils 42A and 42B are respectively converted into voltage signals VT1 and VT2 by means of the first and second conversion circuits 45A and 45B. Subsequently, a difference between the two voltage signals VT1 and VT2 is amplified by a gain k by means of the amp 46. Subsequently, a predetermined bias voltage Vb (for example, 2.5 V) is added to the amplified difference to thereby output a torque detection signal VT3. The torque detection signal VT3 varies in accordance with a torque input to the pinion shaft 17.

$$VT3=k(VT1-VT2)+Vb$$

Likewise, when a torsion deformation occurs in the pinion shaft 17 together with the first and second magnetostrictive films 39A and 39B due to a steering torque input from the steering wheel 11, magnetic flux density varies along two magnetic paths formed by the back-yoke 43 and the first and second magnetostrictive films 39A and 39B, thereby detecting the steering torque based on the variation in magnetic flux density.

Assuming that the output voltages of the first and second magnetization coils 41A and 41B are respectively denoted by VT12 (small impedance) and VT21 (small impedance), and the output voltages of the first and second detection coils 42A and 42B are respectively denoted by VT11 (large impedance) and VT22 (large impedance), a main torque detection value: V31=VT12/(VT12+VT22) is compared with a sub torque detection value as a redundant system: V32=VT21/(VT11+VT21). When the torque detection values are not equal to each other, it is determined that the torque sensor is abnormal. As a result, it is possible to improve detection precision by removing a difference at a neutral point of the steering torque sensor St.

As described above, since the slit 43a is formed in the back-yoke 43 so as to extend in an axial direction, the back-yoke 43 being configured to surround the first and second magnetization coils 41A and 41B and the first and second detection coils 42A and 42B, it is possible to suppress an eddy current occurring in the back-yoke 43 by means of the slit 43a upon magnetizing the first and second magnetization coils 41A and 41B, and thus to improve detection precision of the steering torque sensor St. Further, since the back-yoke 43 is formed by curving one sheet of a rectangular plate member into a cylindrical shape, it is possible to automatically form the slit 43a between the two facing end surfaces of the back-yoke 43 during the curving, and thus to reduce a manufacture cost by simplifying a structure of the back-yoke 43. Furthermore, since the end surface of the back-yoke 43 is flat, an edge influence hardly occurs. Accordingly, it is possible to stabilize alternating-current resistances of the first and second magnetization coils 41A and 41B and the first and second detection coils 42A and 42B, and thus to further improve detection precision.

Figure 7:
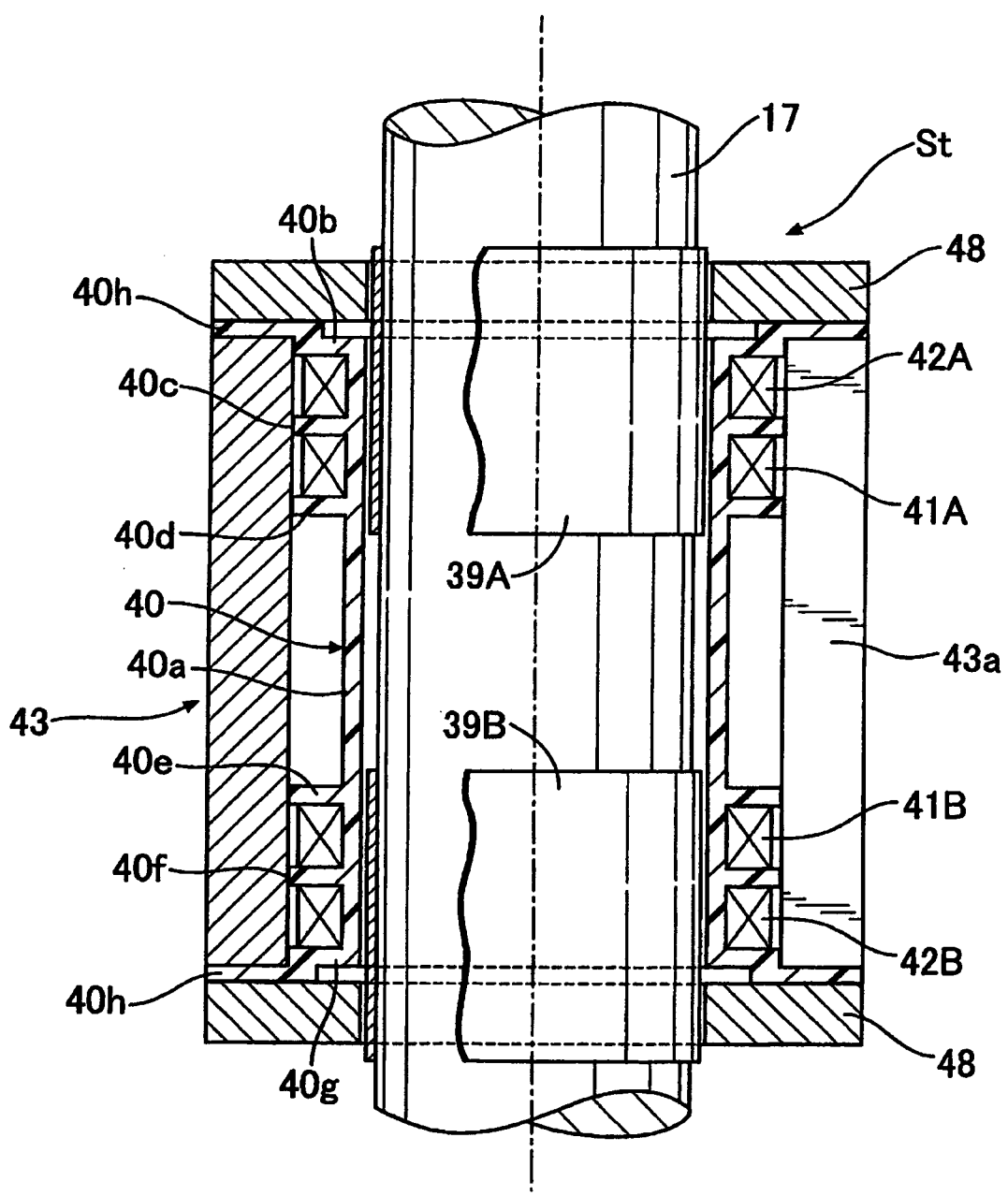
FIG. 7 is a view corresponding to FIG. 4 and showing a second embodiment.

Hereinafter, a second embodiment of the invention will be described with reference to FIG. 7.

The second embodiment provides a steering torque sensor to further improve output gains of the first and second detection coils 42A and 42B in such a manner that yoke rings 48 and 48 formed by an annular plate member are respectively added to both axial ends of the back-yoke 43 according to the first embodiment so as to form a more efficient magnetic path. At this time, if axial end surfaces of the back-yoke 43 are directly brought into contact with inner surfaces of the yoke rings 48 and 48, respectively, the magnitude of magnetic permeability becomes unstable due to a difference in parallel degree or surface roughness of the contact portion, thereby deteriorating detection precision of the steering torque sensor St.

However, in the second embodiment, plate-shaped extension portions 40h and 40h having a predetermined thickness are formed in such a manner that the flanges 40b and 40g of both axial ends of the bobbin 40 extend in a radial direction. Subsequently, the extension portions 40h and 40h are sandwiched between the back-yoke 43 and the yoke rings 48 and 48, thereby disposing the back-yoke 43 and the yoke rings 48 and 48 so as not to contact with each other. For this reason, magnetic permeability between the back-yoke 43 and the yoke rings 48 and 48 slightly decreases. However, it is possible to solve a problem of a difference in magnetic permeability depending on the state of the contact portion and to make the magnetic permeability uniform by maintaining a distance at the contact portion to be uniform. As a result, it is possible to improve detection precision of the steering torque sensor St.

When the steering torque sensor St described in the first and second embodiments is used in the vehicle steering apparatus, since the electric motor M of the power steering apparatus is controlled by highly precisely detecting the steering torque input from the steering wheel 11, it is possible to improve a steering feeling.

Hereinafter, a third embodiment of the invention will be described with reference to FIGS. 8 to 17. The configuration of the electric power steering apparatus of the third embodiment is mostly the same as the first embodiment, excluding the configuration of the magnetostrictive torque sensor device.

Figure 8:
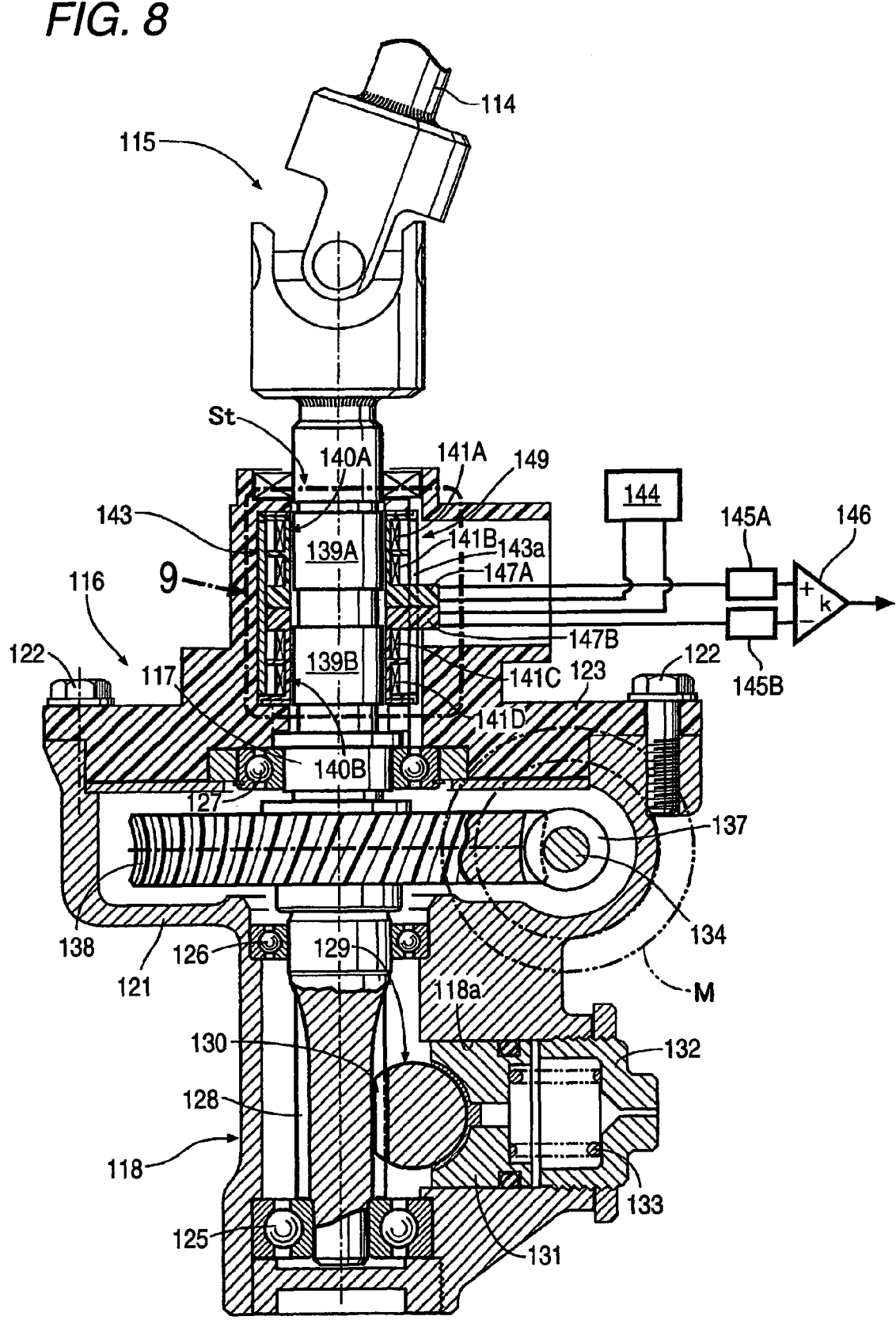
FIG. 8 is an enlarged sectional view of a third embodiment, taken along the line 2-2 of FIG. 1.
Figure 9:
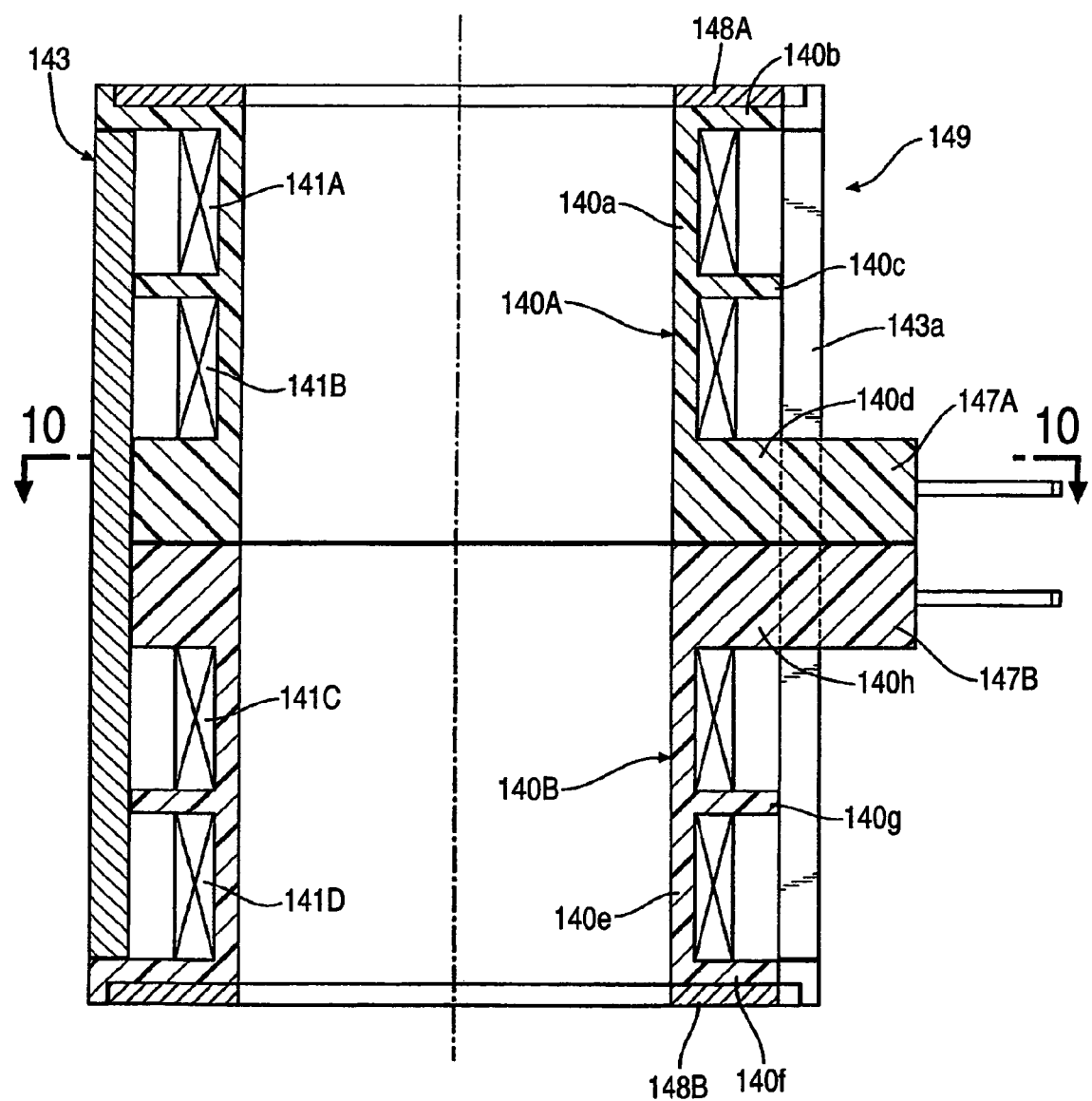
FIG. 9 is an enlarged view showing a part indicated by "9" in FIG. 8.
Figure 10:
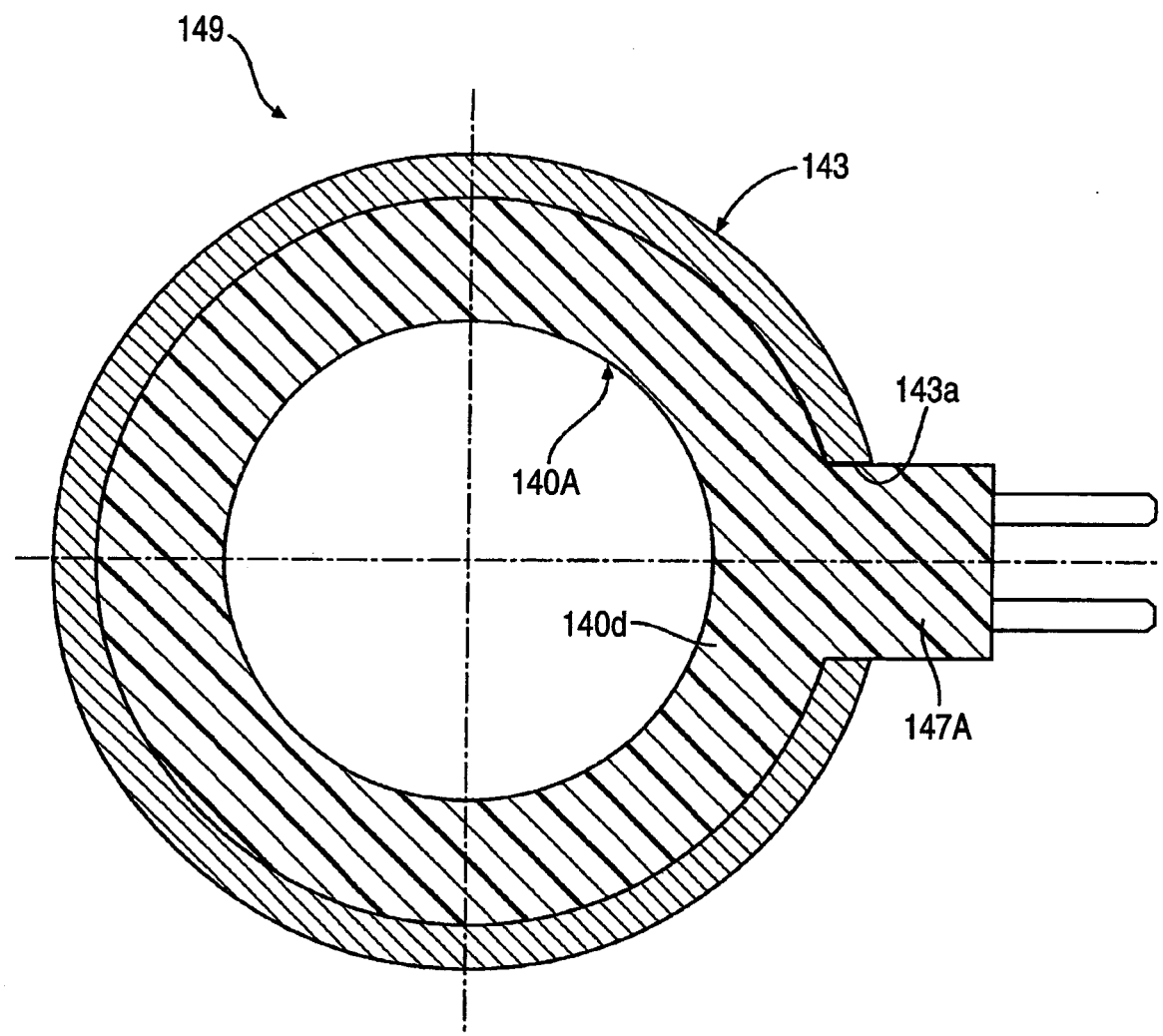
FIG. 10 is a sectional view taken along the line 10-10 of FIG. 9.

As shown in FIGS. 8 to 10, a first cylindrical yoke ring 148A, which is formed by a magnetic body and is used in cooperation with the back-yoke 143, overlaps with an upper surface of the first flange 140b formed at an upper end of the first bobbin 140A. A second cylindrical yoke ring 148B, which is formed by a magnetic body and is used in cooperation with the back-yoke 143, overlaps with a lower surface of the first flange 140f formed at a lower end of the second bobbin 140B. Also shown are cylindrical bobbin bodies 140a, 140e, and flanges 140c, 140d, 140g, and 140h.

The first to fourth coils 141A to 141D are connected to a magnetization circuit 144 and first and second conversion circuits 145A and 145B. The first and second conversion circuits 145A and 145B are connected to an amp 146. At this time, wires extending from the first to fourth coils 141A to 141D are drawn out by a first terminal block 147A integrally formed with the first bobbin 140A and a second terminal block 147B integrally formed with the second bobbin 140B. Then, the first and second terminal blocks 147A and 147B are fitted to the slit 143a of the back-yoke 143 so that a circumferential gap does not exist.

The back-yoke 143, the first and second yoke rings 148A and 148B, the first and second bobbins 140A and 140B, the first to fourth coils 141A to 141D, and the first and second terminal blocks 147A and 147B constitute a coil unit 149 according to the third embodiment.

Next, a forming process of the upper case 123, into which the coil unit 149 is integrally inserted, will be described with reference to FIGS. 11 to 17.

Figure 11:
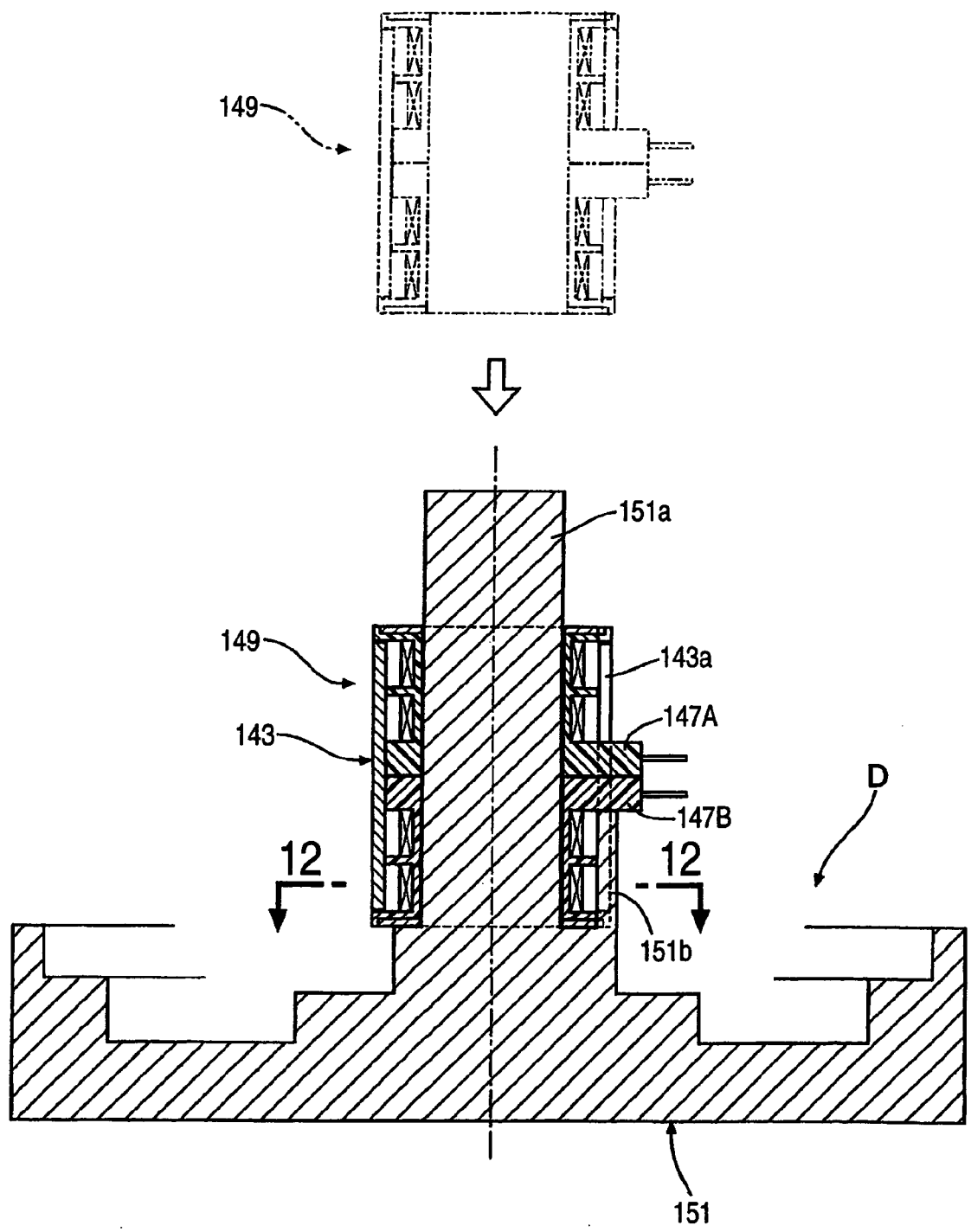
FIG. 11 is an explanatory view showing a coil unit setting step.
Figure 12:
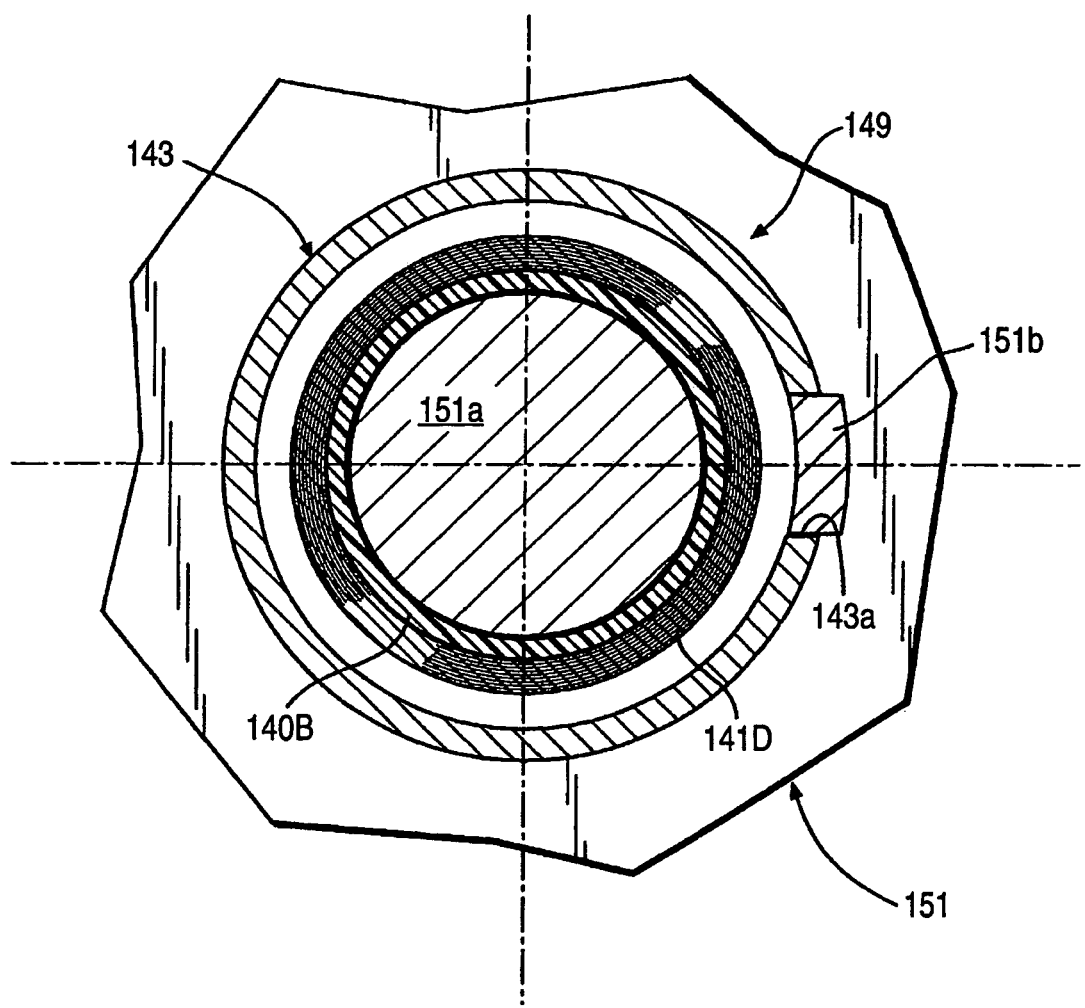
FIG. 12 is a sectional view taken along the line 12-12 of FIG. 11.

First, as shown in FIGS. 11 and 12, inner peripheral surfaces of the first and second bobbins 140A and 140B of the sub-assembly coil unit 149 are fitted to a cylindrical coil unit support portion 151a uprightly formed in a lower mold 151 of a die D. At this time, a rectangular-cylindrical slit fitting portion 151b uprightly formed in the lower mold 151 is fitted to a lower portion of the slit 143a of the back-yoke 143, that is, a portion lower than the second terminal block 147B.

Figure 13:
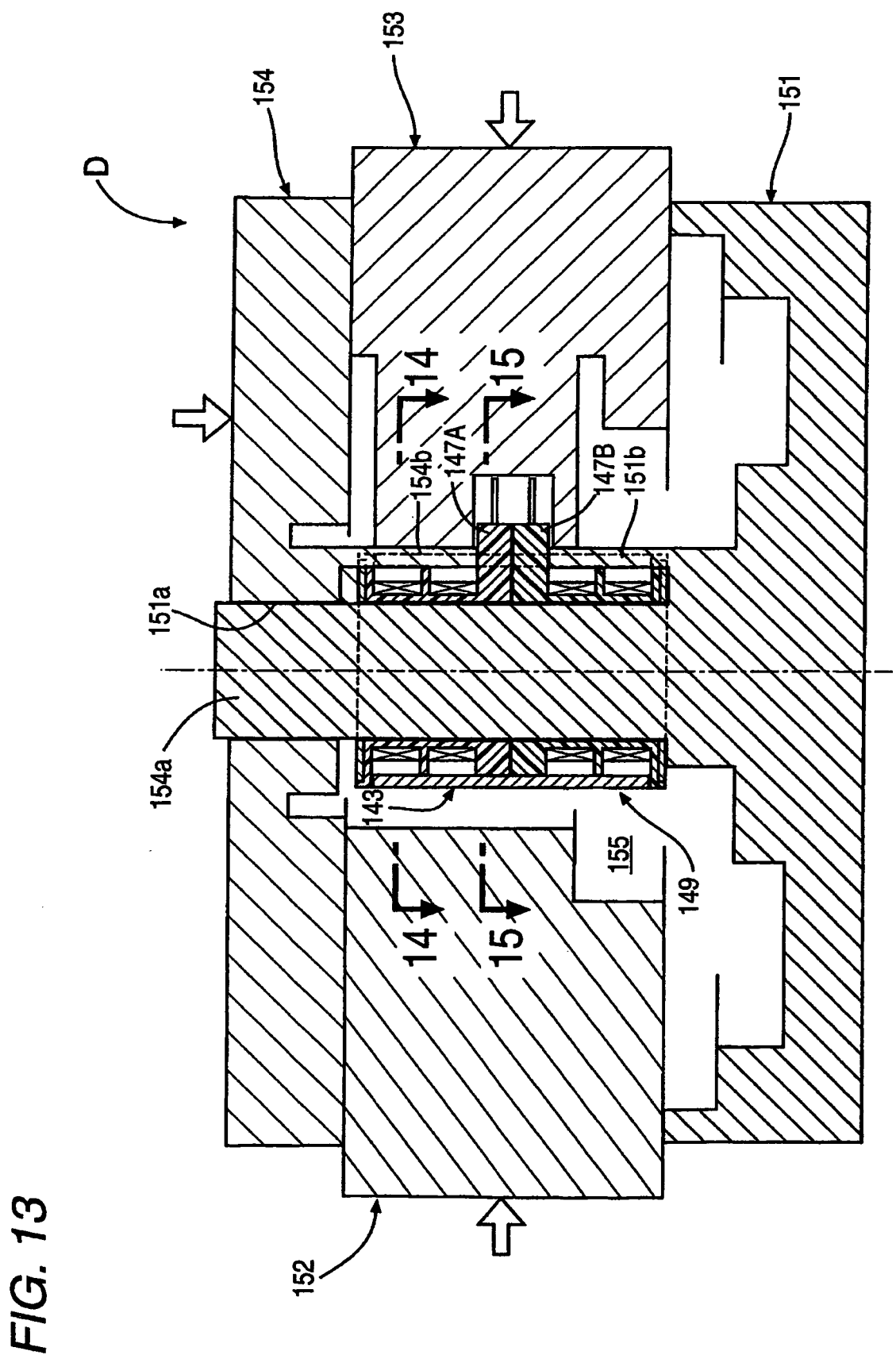
FIG. 13 is an explanatory view showing a die setting step.
Figure 14:
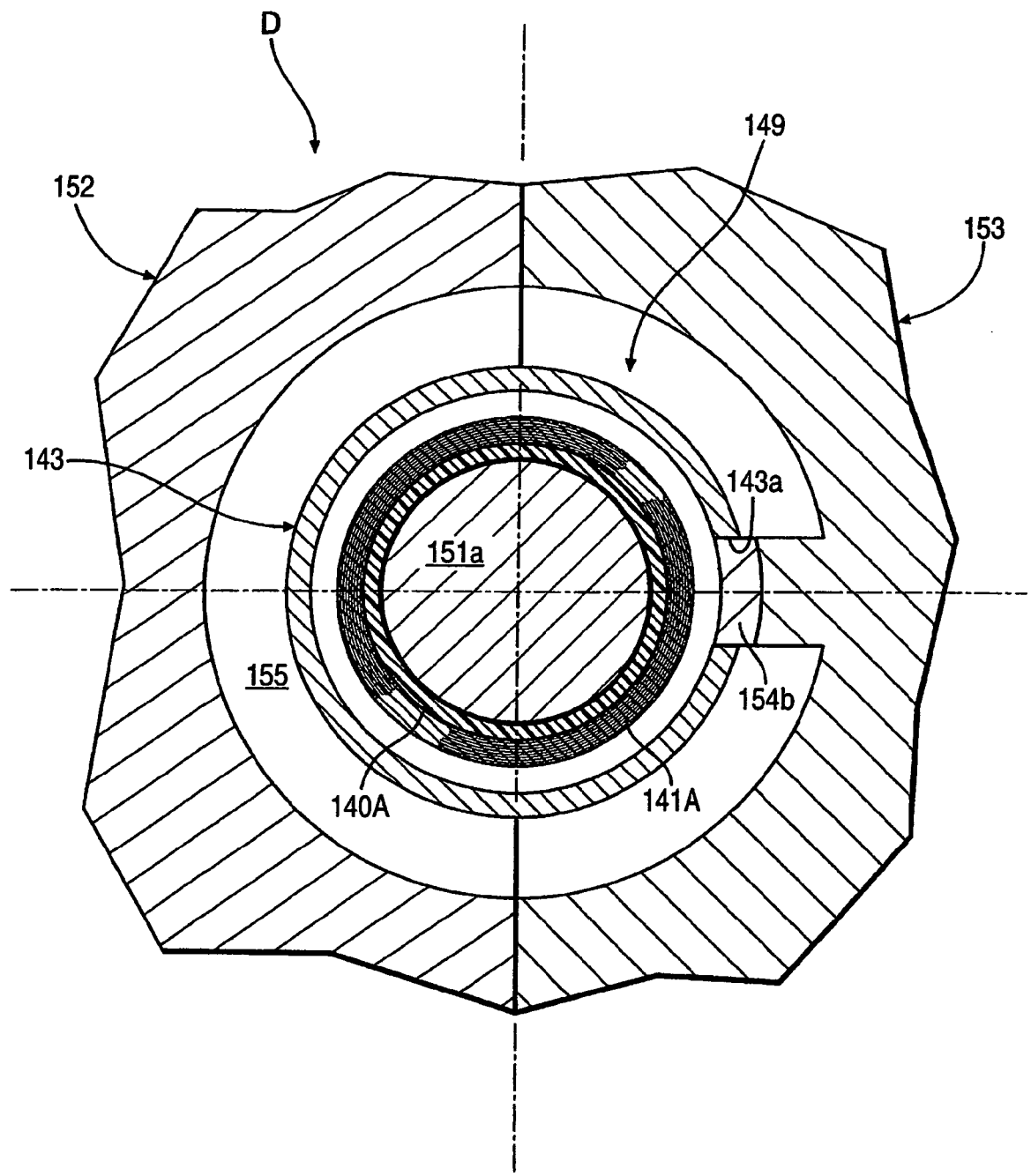
FIG. 14 is a sectional view taken along the line 14-14 of FIG. 13.
Figure 15:
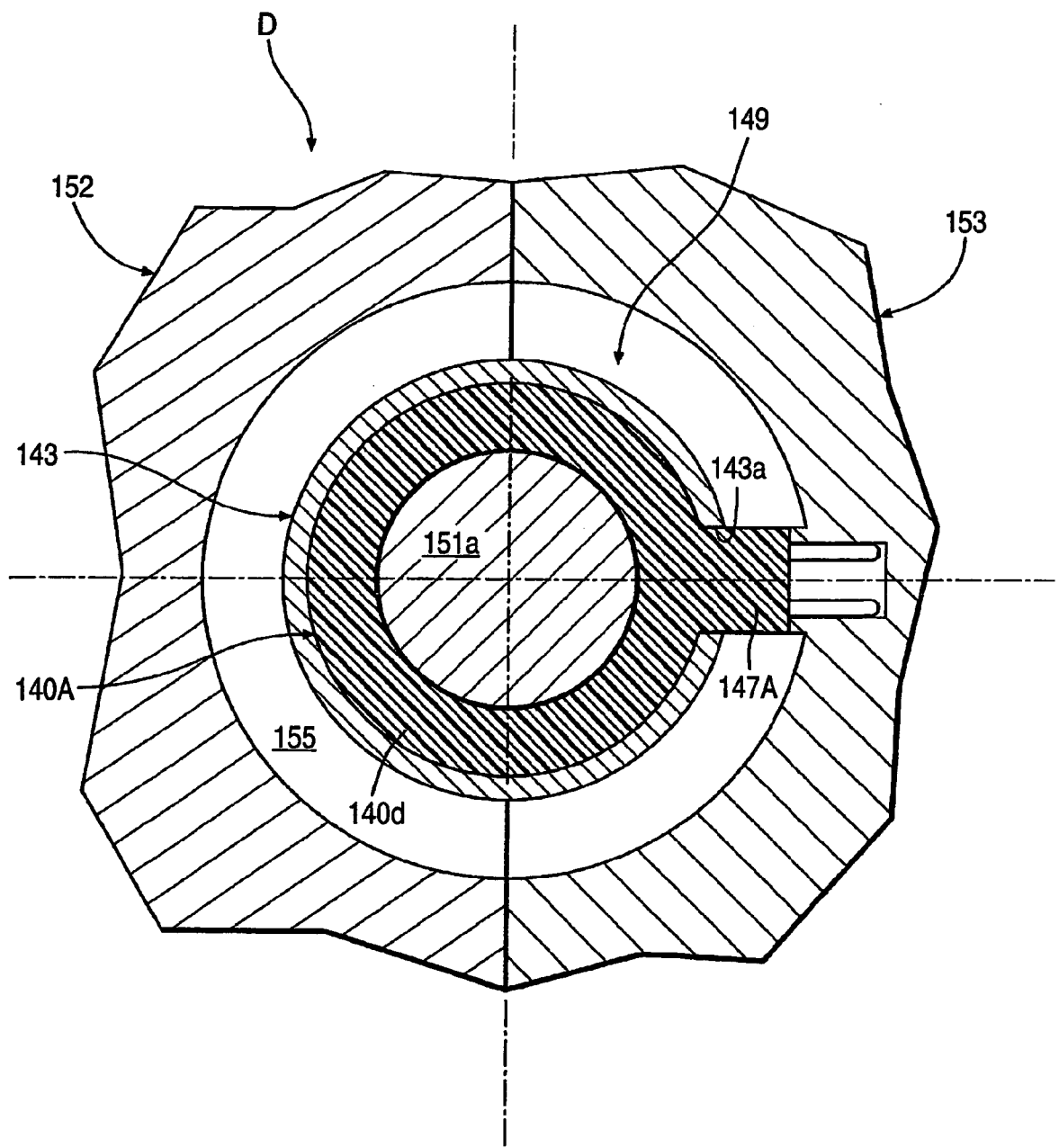
FIG. 15 is a sectional view taken along the line 15-15 of FIG. 13.

Subsequently, as shown in FIGS. 13 to 15, traverse molds 152 and 153 are set to an upper portion of the lower mold 151, and then an upper mold 154 is set from the upside. At this time, an upper end of the coil unit support portion 151a of the lower mold 151 is closely fitted to an opening 154a of the upper mold 154. The rectangular-cylindrical slit fitting portion 154b drooping from the upper mold 154 is fitted to an upper portion of the slit 143a of the back-yoke 143, that is, a portion higher than the first terminal block 147A.

Figure 16:
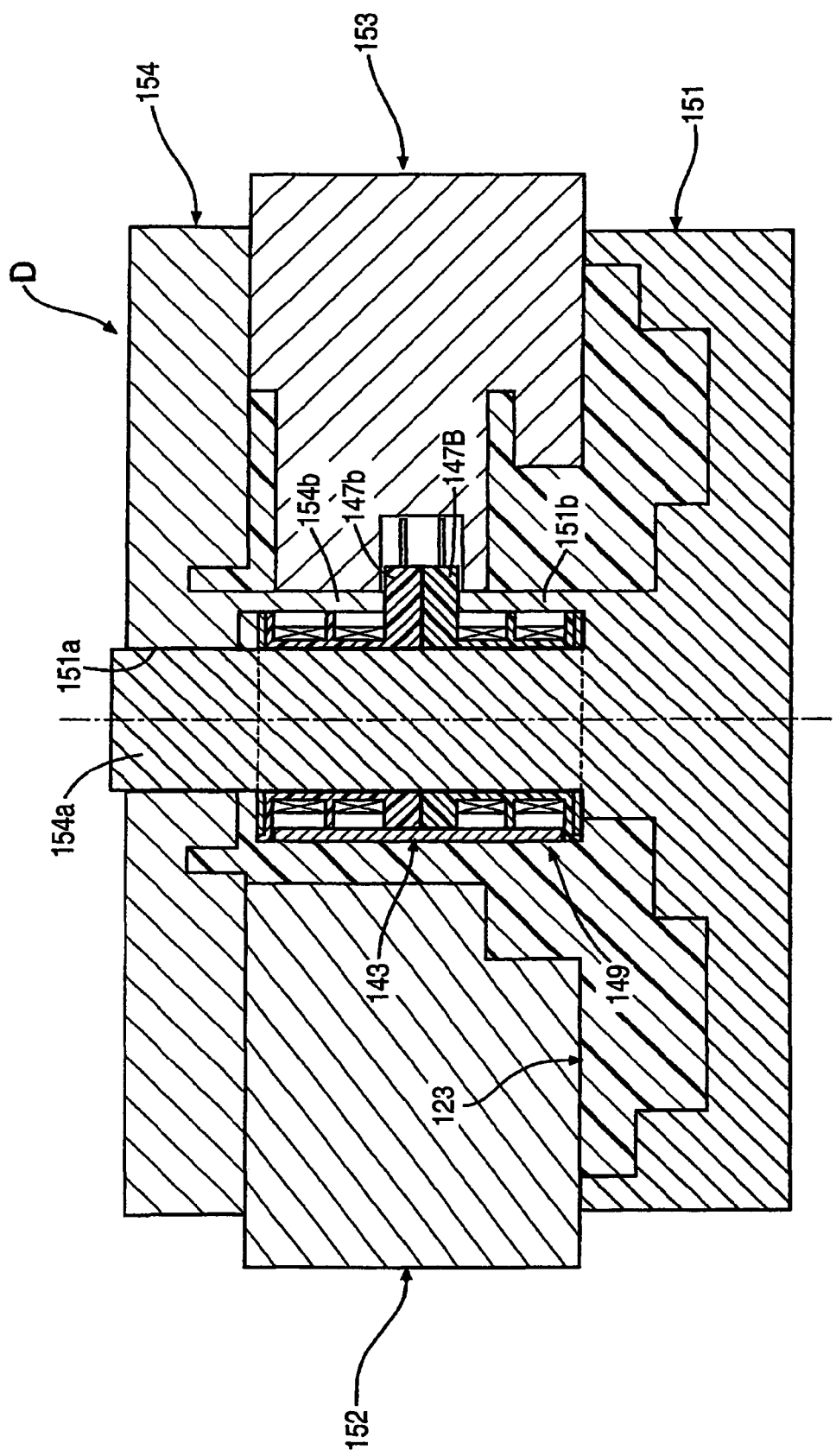
FIG. 16 is an explanatory view showing a resin molding step.
Figure 17:
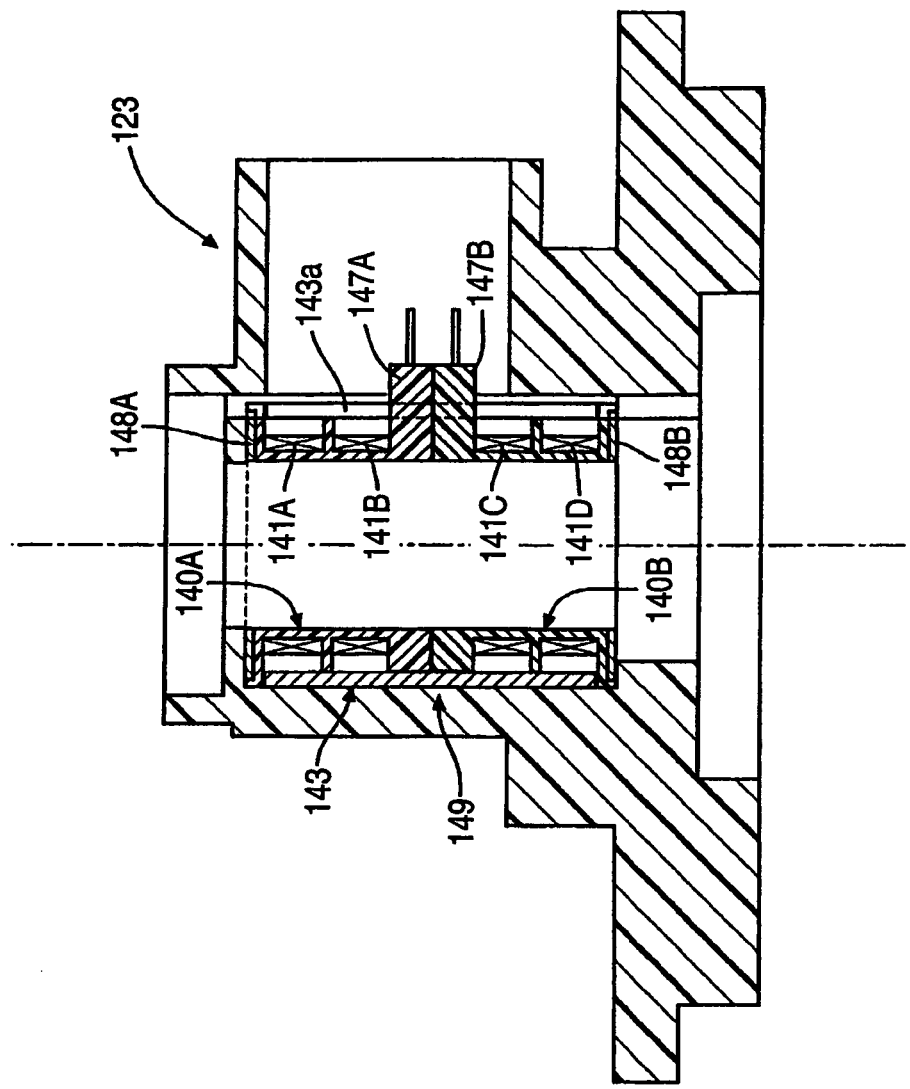
FIG. 17 is a view showing a formed upper case.

In this manner, when a cavity 155 is formed between the coil unit 149 and the lower molds 151, the traverse molds 152 and 153, and the upper molds 154 which are disposed in the periphery of the coil unit 149, as shown in FIG. 16, a melted synthetic resin is injected into the cavity 155, thereby forming the upper case 123. Then, when the die D is opened after the synthetic resin is hardened, as shown in FIG. 17, the upper case 123, into which the coil unit 149 is integrally inserted, is formed.

As described above, since the slit 143a which extends in an axial direction is formed in the back-yoke 143 which surrounds the first to fourth coils 141A to 141D, it is possible to suppress an eddy current occurring in the back-yoke 143 by means of the slit 143a upon magnetizing the first to fourth coils 141A to 141D, and thus to improve detection precision of the steering torque sensor St. In addition, since the back-yoke 143 is formed by curving one sheet of a rectangular plate member into a cylindrical shape, it is possible to reduce a manufacture cost due to a simple structure. Also, since the slit 143a is automatically formed between two facing edges of the back-yoke 143 during the curving operation, it is possible to further reduce a manufacture cost.

Further, since the slit 143a is formed in the back-yoke 143, when a load is applied to the inside in a radial direction, the back-yoke 143 is easily deformed in a direction where the slit 143a becomes smaller. However, since the slit 143a is fitted to the first and second terminal blocks 147A and 147B, it is possible to reliably suppress a deformation of the back-yoke 143. Also, Since the first and second bobbins 140A and 140B, the first to fourth coils 141A to 141D, the first and second terminal blocks 147A and 147B, and the back-yoke 143 are integrally molded with the inside of the coil unit 149, it is possible to integrally form them in a rigid manner, and to reliably prevent a deformation of the back-yoke 143 in a direction where the slit 143a is closed by a pressure upon forming the coil unit 149 by means of the die D. For example, even in the case where the coil unit 149 is set to the inside of the die D so as to form the upper case 123 by an injection molding, the back-yoke 143 is deformed to the inside in a radial direction due to a pressure of the injected resin. However, it is possible to reliably suppress a deformation of the back-yoke 143 by means of the slit fitting portions 151b and 154b of the lower and upper molds 151 and 154 and the first and second terminal blocks 147A and 147B which are fitted to the slit 143a. Also, since the slit fitting portions 151b and 154b of the lower and upper molds 151 and 154 are fitted to the slit 143a of the back-yoke 143, it is possible to exhibit a function of positioning the coil unit 149 in the die D in a rotary direction.

As described above, the exemplary embodiments of the invention are described, but the invention may be modified into various forms in a scope without departing from the spirit of the invention.

For example, in the exemplary embodiments, the magnetostrictive torque sensor device is used as the steering torque sensor St. However, the magnetostrictive torque sensor device according to the invention may be used as an arbitrary torque sensor for detecting a torque input to a rotary shaft.

Furthermore, in the third embodiment, the first and second terminal blocks 147A and 147B are integrally formed with the first and second bobbins 140A and 140B, but may be formed into separate members.

Moreover, in the third embodiment, the coil unit 149 includes the first and second yoke rings 148A and 148B, but the first and second yoke rings 148A and 148B may be omitted.

What is claimed is:

1. A magnetostrictive torque sensor device which detects a torque applied to a rotary shaft, comprising: a magnetostrictive portion provided on a surface of the rotary shaft; a coil comprising: a bobbin arranged in outer periphery of the magnetostrictive portion; and a wire wound around the bobbin; a cylindrical back-yoke disposed in outer periphery of the coil, wherein a slit extending in an axial direction is provided on the back-yoke; and a pair of yoke rings, having no slit, disposed at both axial ends of the back-yoke, wherein the back-yoke and the yoke rings are disposed with a gap so as not to contact with each other, and the yoke rings are formed by an annular plate member.

2. The magnetostrictive torque sensor device according to claim 1, wherein the slit is interposed between a pair of flat end surfaces having a predetermined width in a radial direction.

3. The magnetostrictive torque sensor device according to claim 1, wherein a terminal block which connects the wire with an external wiring is disposed within the slit.

4. The magnetostrictive torque sensor device according to claim 1, wherein the back-yoke is formed by curving a rectangular magnetic metal plate into a cylindrical shape so that the slit is formed between the pair of facing end surfaces of the rectangular magnetic metal plate.

5. The magnetostrictive torque sensor device according to claim 1, wherein the bobbin includes an annular extension portion which extends outward in a radial direction, and wherein the extension portion is interposed in the gap between the back-yoke and the yoke rings.

6. The magnetostrictive torque sensor device according to claim 3, further comprising: a synthetic-resin housing arranged in outer periphery of the back-yoke, wherein the bobbin in the coil, the terminal block, and the back-yoke are disposed within the housing in an integral fashion.

7. A vehicle steering apparatus using the magnetostrictive torque sensor device according to any one of claims 1 to 6, wherein the magnetostrictive torque sensor device is used as a steering torque sensor which detects a steering torque input to steering shafts, and wherein an operation of an actuator of an electric power steering apparatus is controlled on the basis of the steering torque detected by the steering torque sensor.

* * * * *